United States Patent [19]

Lovercheck et al.

[11] Patent Number: 4,499,864

[45] Date of Patent: Feb. 19, 1985

[54] HYDRIDE COLD START CONTAINER IN FUEL TREATMENT AND DISTRIBUTION APPARATUS AND METHOD

[75] Inventors: Dale R. Lovercheck; George P. Curran, both of Pittsburgh, Pa.

[73] Assignee: Conoco Inc., Wilmington, Del.

[21] Appl. No.: 465,397

[22] Filed: Feb. 10, 1983

[51] Int. Cl.³ .............................................. F02B 43/08
[52] U.S. Cl. ............................... 123/3; 123/DIG. 12; 123/576; 123/557; 123/1 A; 48/197 R
[58] Field of Search .................. 123/1 A, 3, DIG. 12, 123/576, 557; 48/197 R

[56] References Cited

U.S. PATENT DOCUMENTS

| | | | |
|---|---|---|---|
| 1,319,718 | 10/1919 | Martin | 123/557 |
| 1,361,503 | 12/1920 | Smith | 123/557 |
| 3,086,877 | 5/1978 | Henkel et al. | 123/1 A |
| 3,315,479 | 4/1967 | Wiswall et al. | 62/48 |
| 4,016,836 | 4/1977 | Mackay et al. | 123/3 |
| 4,018,190 | 4/1977 | Henault | 123/3 |
| 4,045,522 | 9/1977 | Chen et al. | 123/3 |
| 4,088,450 | 5/1978 | Kosaka et al. | 123/1 A |
| 4,091,086 | 5/1978 | Hindin et al. | |
| 4,178,882 | 12/1979 | Anderson et al. | 123/1 A |
| 4,211,537 | 8/1980 | Teitel | 123/3 |
| 4,214,699 | 7/1980 | Buchner et al. | 123/1 A |
| 4,225,320 | 9/1980 | Gell | 123/3 |
| 4,226,213 | 10/1980 | Bernauer | 123/3 |
| 4,244,188 | 1/1981 | Joy | 123/3 |
| 4,253,428 | 3/1981 | Billings et al. | 123/3 |
| 4,282,835 | 8/1981 | Peterson et al. | 123/3 |
| 4,290,267 | 9/1981 | Buchner | 123/3 |
| 4,385,726 | 5/1983 | Bernauer et al. | 123/DIG. 12 |
| 4,418,653 | 12/1983 | Yoon | 123/576 |

FOREIGN PATENT DOCUMENTS 2420820 11/1975 Fed. Rep. of Germany ... 123/DIG. 12
3005373 10/1981 Fed. Rep. of Germany ... 123/DIG. 12

OTHER PUBLICATIONS

"Prototype Hydrogen Automobile Using a Metal Hydride" D. L. Henriksen et al., pp. 7c-1 thru 7c-12, 3/1976.
"Automotive Hydride Tank Design", D. B. Mackay, pp. 7c-13 thru 7c-23, 3/1976.
AHT 5-Billings, 12/1981.
Energy, Encyclopedia of, pp. 326-330.
Kikuchi et al., J. Japan Petrol. Inst., 23, 328-333, (1980).

Primary Examiner—E. Rollins Cross
Attorney, Agent, or Firm—Dale Lovercheck; William A. Mikesell, Jr.

[57] ABSTRACT

In a method of producing fuel for start-up to an automobile internal combustion engine which is continuously operated after start-up on alcohol and/or dissociated alcohol and/or liquid hydrocarbon
the improvement comprising the steps of:
(a) providing a readily replaceable first container having an initial amount of hydride therein in fluid flow communication with said internal combustion engine,
(b) heating said hydride whereby hydrogen is produced leaving a hydride product and a remainder of hydride
said remainder of hydride being lesser in amount than said initial amount of hydride,
(c) initially starting said engine,
whereby hydrogen is produced from the hydride for initially starting said engine and said remainder of hydride without regeneration of hydride product is available for the next starting of said engine.

10 Claims, 6 Drawing Figures

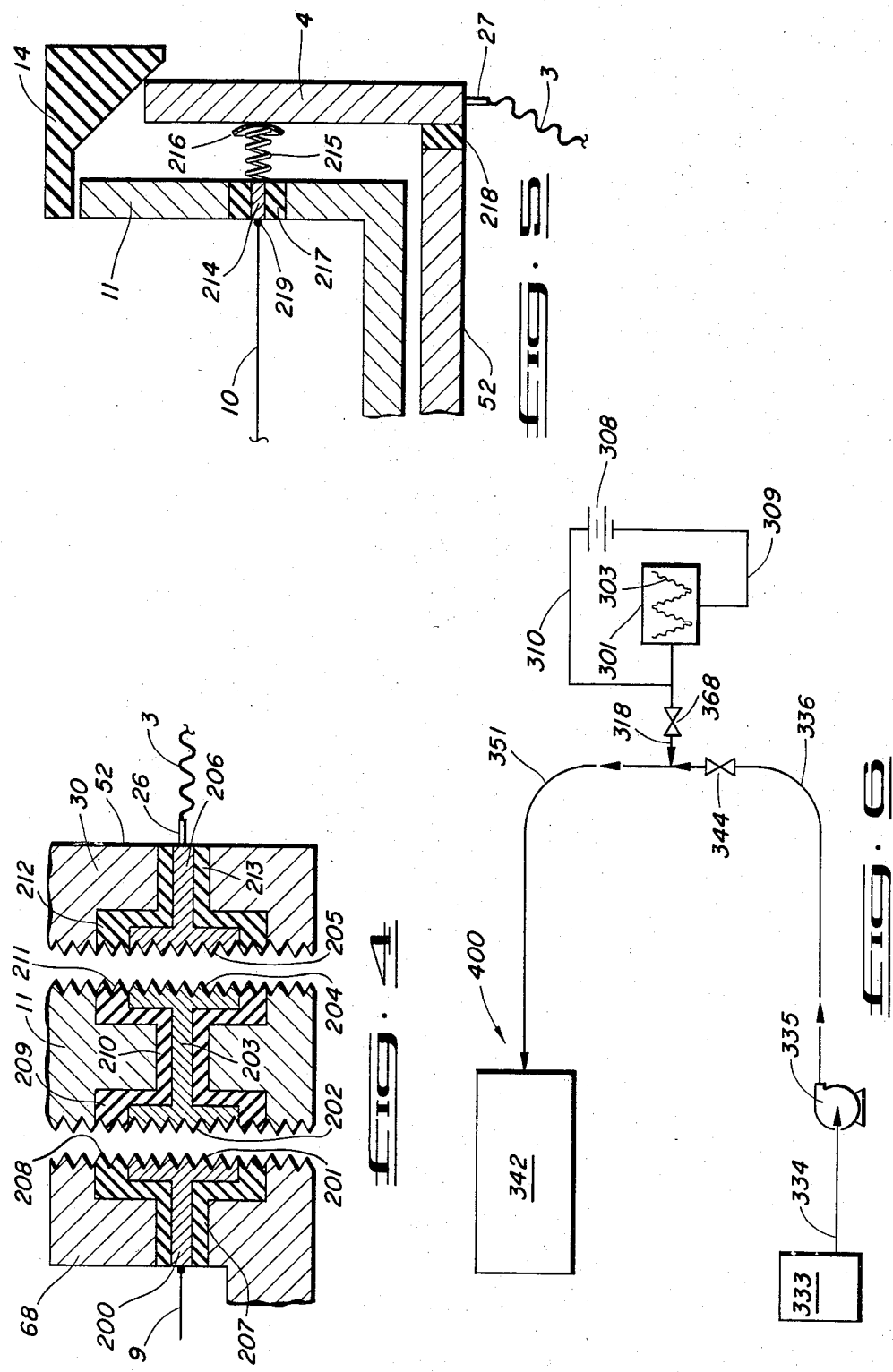

4,499,864

HYDRIDE COLD START CONTAINER IN FUEL TREATMENT AND DISTRIBUTION APPARATUS AND METHOD

BACKGROUND OF THE INVENTION

Kosaka et al, discloses in U.S. Pat. No. 4,088,450 a plurality of catalysts arranged in a desirable order based on the temperature gradient existing in the reaction chamber. The operating temperature of the catalyst and the temperature of the portion of the reaction chamber it is in, are matched so as to avoid catalytic degradation and/or catalytic inactivity.

Hindin et al in U.S. Pat. No. 4,091,086 discloses a catalytic composition particularly useful in the production of hydrogen from methanol, especially by steam reforming, which comprises a mixture of zinc oxide, copper oxide, thorium oxide and aluminum oxide whereby the activity and activity maintenance of the catalytic composition is superior relative to a composition otherwise substantially the same but lacking thoria.

Henkel et al in U.S. Pat. No. 3,086,877 discloses a fuel gas obtained in a reformed gas generator through the catalytic reaction of hydrocarbons and a gas containing oxygen and provided to an internal combustion engine has its heat content along with that of the exhaust gas of the engine used to convert methanol endothermically into a gas mixture containing carbon monoxide and hydrogen with the gas mixture so formed fed to one or both the reformed gas generator and, along with the fuel gas, the internal combustion engine.

Peterson et al in U.S. Pat. No. 4,282,835 provides for synthesizing CO and $H_2$ fuel from $CH_3OH$ and water in a synthesizer. The methanol is confined in a fuel tank as a liquid. The water is confined in a water tank. A fuel pump and a water pump force fuel and water to a mixing valve. A heat exchanger heats the fuel and water to a gas which passed through Ni or $Al_2O_3$ catalyst at 500° C. where the $CH_3OH$ disassociates to CO and $H_2$. The gas passes to a synthesizer containing Fe or $Al_2O_3$ above 500° C. where $H_2O$ and CO form $H_2$ and $CO_2$. The gas is mixed with air and passed to an engine.

Chen et al in U.S. Pat. No. 4,045,522 provides a preengine converter. The catalyst in the first reactor may be copper zinc chromite. Col. 2, lines 28–35. A second catalyst is a hydrocarbon cracking catalyst such as zeolite.

Kikuchi et al in J. Japan Petrol. Inst., 23, (5), 328-333 (1980) discloses exothermic partial combustion during start-up of a methanol fueled engine. At Table I on page 329 he lists copper/oxide zinc oxide catalyst as well as copper/nickel catalyst for conversion of methanol on various supported copper catalysts. At page 332 Kikuchi discusses methanol conversion to give formaldehyde type intermediate which decomposes to hydrogen and carbon monoxide as shown in the first two equations listed therein.

Wiswall et al in U.S. Pat. No. 3,315,479 disclose a method for storing hydrogen whereby gaseous hydrogen is absorbed by nickel-magnesium alloys at temperatures above 250° C. and pressures above 18 psi.

Energy, Encyclopedia of, pages 326–330 discloses at page 327 that hydrogen may be combined with metals to form loosely bound hydrides, which may then be dissociated at elevated temperature. Attractive hydrides are based on Mg-Ni and Mg-Cu alloys. The dissociation temperatures at 1 atmosphere are about 250° C. The dissociation heat may be obtained from the exhaust of a hydrogen fueled engine.

SUMMARY OF THE INVENTION

In a method of producing fuel for start-up to an automobile internal combustion engine which is continuously operated after start-up on alcohol and/or dissociated alcohol and/or liquid hydrocarbon
the improvement comprising the steps of:
(a) providing a readily replaceable first container having an initial amount of hydride therein in fluid flow communication with said internal combustion engine,
(b) heating said hydride whereby hydrogen is produced leaving a hydride product and a remainder of hydride
said remainder of hydride being lesser in amount than said initial amount of hydride,
(c) initially starting said engine,
whereby hydrogen is produced from the hydride for initially starting said engine and said remainder of hydride without regeneration of hydride product is available for the next starting of said engine.

A device for hydrogen production and distribution to start an automobile internal combustion engine comprising:
(a) A hydride container means,
(b) electrical resistance heating means,
(c) first container electrical contact means,
(d) second container electrical contact means,
(e) outlet passage means,
(f) hydrogen generating means said container means having a container wall said container wall having an inner surface said inner surface of said container wall defining a hydrogen production chamber,
said hydrogen generating means being supported within said container means,
said electrical resistance heating means being supported within said container means,
said first electrical contact means being connected to pass electrical current between said first electrical contact means and said electrical resistance heating means,
said second electrical contact means being connected to pass electrical current between said electrical resistance heating means and said second electrical contact means,
said outlet passage means being connected fluid flow communication to said container wall,
whereby hydrogen is generated by heating said hydrogen generating means in said hydrogen production chamber, and said hydrogen passes from said hydrogen production chamber through said outlet passage means.

A device for hydrogen production and distribution to start an automobile internal combustion engine comprising:
(a) a hydride container means,
(b) electrical resistance heating means,
(c) first container electrical contact means,
(d) second container electrical contact means,
(e) outlet passage means,
(f) hydrogen generating means said container means having a container wall said container wall having an inner surface said inner surface of said container wall defining a hydrogen production chamber,
said hydrogen generating means being supported within said container means,
said electrical resistance heating means being supported within said container means, said first electrical contact means being connected to pass electrical current between said first electrical contact means and said electrical resistance heating means, said second electrical contact means being connected to pass electrical current between said electrical resistance heating means and said second electrical contact means, said outlet passage means being connected fluid flow communication to said container wall, whereby hydrogen is generated by heating said hydrogen generating means in said hydrogen production chamber, and said hydrogen passes from said hydrogen production chamber through said outlet passage means.

A method of hydrogen production and distribution for starting an automobile internal combustion engine comprising the steps as follows:

(a) providing a hydride containing means,
an electrical resistance heating means,
an outlet passage means,
hydrogen generating means, (b) providing a fuel distribution means, (c) providing electrical current source means, (d) connecting said hydrogen production means of step (a) in fluid flow communication with said fuel distribution means and passing electrical current between said electrical resistance heating means and said electrical current source means, (e) passing electrical current through said electrical resistance heating means to heat said hydrogen production means whereby hydrogen is formed from said hydrogen generating means, (f) passing said hydrogen through said fuel distribution means to said internal combustion engine, (g) starting said internal combustion engine.

Beneficially the hydride for cold starting does not require high pressure storage. Additionally the hydrogen bound in the hydride form is safe from explosion.

Beneficially the invention provides for starting an internal combustion engine.

The invention provides improved starting of automobile engines which may be operated at least in part on liquid fuel.

BRIEF DESCRIPTION OF THE DRAWING

FIG. 4 shows a partial cross sectional view of a hydride container system in accordance with the present invention.

FIG. 5 is a partial cross sectional view of a container and container holder in accordance with the present invention.

FIG. 6 is a schematic representation of an overall system in accordance with the invention using a conventional fuel.

DETAILED DISCUSSION OF THE INVENTION

Figure 1:
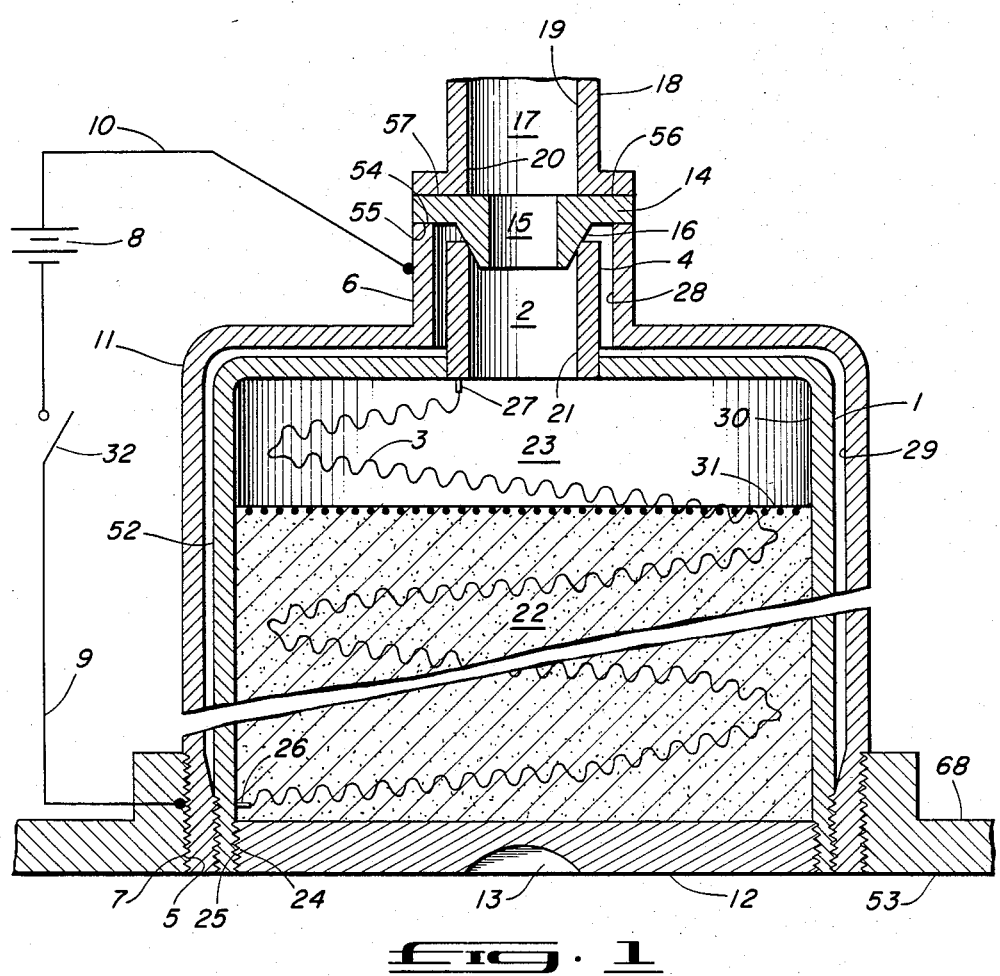
FIG. 1 shows a hydride container having internal electric resistance heating means.

The invention relates to a fuel treatment and distribution apparatus and method as shown in the drawings.

The present invention provides an improved cold starting method and apparatus. Alcohol and/or liquid hydrocarbon fueled automobiles have difficulty starting at low temperatures for example where the ambient temperature is below freezing as the vapor pressure of alcohol and/or hydrocarbon is low. The method and apparatus of the present invention provides for the formation of hydrogen from hydride for cold starting. The internal combustion engine can be cold started with hydrogen alone or as a mixture of hydrogen and alcohol or hydrocarbon. After the engine is started the hydride container is isolated from the remainder of the system by closing a control valve and all or part of the fuel may be fed directly to the engine or through an operational dissociation reactor which preferably is provided with a catalyst for the formation of hydrogen and carbon monoxide. Dissociated alcohol, hydrocarbon, alcohol vapor, and atomized alcohol each alone or mixtures thereof may be fed to the engine alone or with air.

Where methanol is the fuel in storage tank 33, the reaction

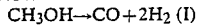
$$CH_3OH \rightarrow CO + 2H_2 \quad (I)$$

takes place in reactor 41 after start-up. In the engine 40, CO and $H_2$ from line 51 are burned after being mixed with $O_2$ for example in gas mixing valve or a carburetor with an air intake opening. The combustion being by the reaction

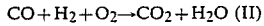
$$CO + H_2 + O_2 \rightarrow CO_2 + H_2O \quad (II)$$

With more particular reference to the drawing, FIG. 1 shows a hydride container in accordance with the present invention. The hydride container 1 has inner surface of the hydride container wall 30. The inner surface of wall 30 encloses the hydrogen chamber 23 and the hydride 22. The container 1 has container outlet passage 2 defined by the inner surface 21 of cylindrical hydride container electrical contact 4. The cylindrical hydride container electrical contact 4 is connected by cylindrical contact connector 27 to the electrical resistance heating element 3. The electrical resistance heating element 3 is connected to the threaded contact connector 26. The threaded contact connector 26 is connected to the hydrided container outer threaded electrical contact 5. The hydride container outer threaded electrical contact 5 is in position for flow of electrical current therefrom to the threaded receptacle electrical contact 7. The threaded receptacle electrical contact 7 is connected by line 9 to battery 8. The line 9 has switch 32 therein. The battery 8 is connected by line 10 through cylindrical receptacle portion 6 to electrical contact 4. As shown in FIGS. 1 and 5 the electrical contact 216 is positioned to engage the cylindrical hydride container electrical contact 4 for the transfer of electrical current therebetween. Thus, when the switch 32 is closed, current flows from the battery 8 through line 10, into the cylindrical hydride container electrical contact 4. The current flow continues from the cylindrical hydride container electrical contact 4 through the electrical resistance heating element 3 before returning to the battery through line 9. Thus, the battery 8 provides a source of electrical current for heating the electrical resistance heating element 3 when the switch 32 is closed and the hydride container 1 is in the operable position shown in cross section in FIG. 1.

By heating the hydride in the hydride container, hydrogen is produced. The hydrogen collects in the hydrogen chamber 23 and passes from the hydrogen chamber 23 through the container outlet passageway 2. From the container outlet passageway 2 the hydrogen passes through the plug passage 15 of plug 14. From the plug passage 15 the hydrogen passes through the distribution passageway 17 in the hydrogen distribution channel 18. The lower face 57 of channel 18 sealingly engages upper face 56 of resilient plug 14. The distribution passage 17 is defined by the distribution channel inner surface 19. The hydrogen distribution channel 18 engages sealingly the upper surface of resilient plug 14. The plug flange lower surface 54 sealingly engages the upper surface of the cylindrical receptacle electrical contact 55 the plug passageway 15 is defined by the plug inner wall surface 20. The beveled plug surface 16 sealingly engages the cylindrical contact inner surface 21 at its upper end. The cylindrical hydride container electrical contact 4 fits within the volume defined by the inner surface 28 of the cylindrical receptacle electrical contact 6. The hydride container 1 is positioned for operation within the volume defined by the receptacle wall inner surface 29. The hydride container is provided with a screen support 31 to support the hydride therein. The hydride container outer threaded electrical contact 5 serves to support the hydride container 1 within the receptacle wall 11 by engaging the threaded receptacle electrical contact 7.

The hydride container wall 52 has inner surface 30. At the lower end of inner surface 30, hydride container inner surface threads 25 are provided. The inner threads 25 supportively and sealingly engage the hydride closure threads 24 of hydride container closure 12. The hydride closure 12 is provided with slot 13 for the insertion of a tool to rotate the hydride container closure 12. By rotating the closure 12 the closure may be removed from the container when the container is removed from the automobile for the purpose of regenerating the products of hydrogen formation from hydride. The threaded receptable electrical contact 7 is supported by the automobile body 68. The automobile body 68 has automobile outer surface 53.

The invention operates by the insertion of the hydride container into the receptacle wall 11 with the completion of the electrical connection to the battery 8. Followed by heating of the hydride to produce hydrogen for the start-up of the internal combustion of the automobile. The heating of the hydride produces hydrogen and products of hydrogen formation from hydride. A remainder of hydride is then available for the next start-up of the internal combustion engine. Thus, with each start-up of the internal combustion engine the amount of hydride in the hydride container diminishes. Preferably the amount of hydride initially in the hydride container is sufficient for at least 10 start-ups of the internal combustion engine. Most preferably the amount of hydride initially in the hydride container is sufficient for at least 100 startups of the internal combustion engine.

Preferred hydrides for use as the hydrogen producing material contained within the container 1 are hydrides of magnesium nickel alloy ($Mg_2Ni$), magnesium copper alloy ($Mg_2Cu$) and iron titanium. Thus, production of hydrogen from hydrides of magnesium nickel alloy would produce hydrogen and magnesium nickel alloy. The magnesium nickel alloy would be available for regeneration when the amount of hydrides of magnesium nickel alloy is no longer sufficient for starting the internal combustion engine.

The regeneration would be by the removal of the hydride container 1 from the receptacle wall 11 of the automobile. Taking the hydride container to a regeneration unit. Then regenerating the hydride at the regeneration unit by means known in the art for example that disclosed by Wiswall et al U.S. Pat. No. 3,315,479.

Figure 2:
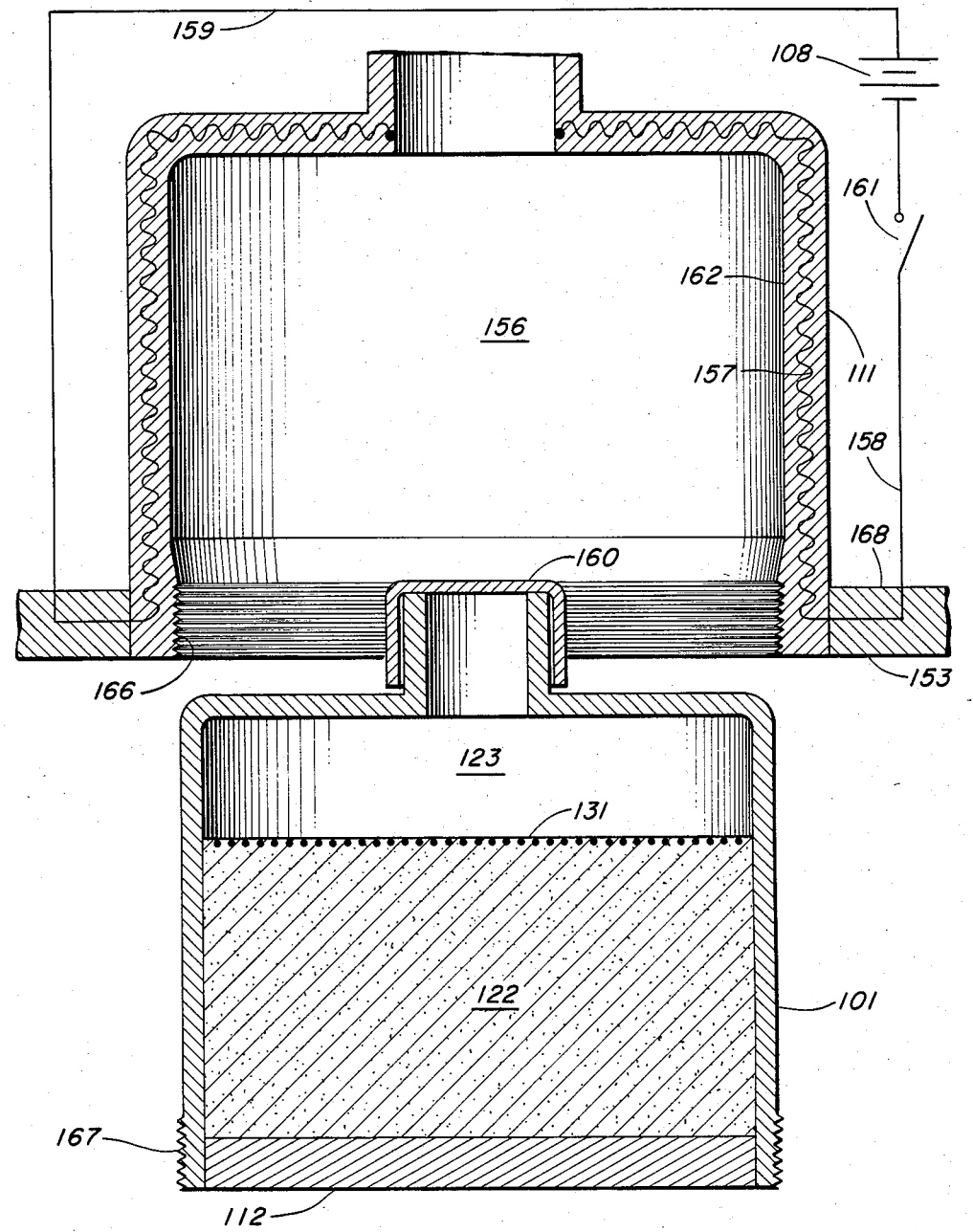
FIG. 2 shows a hydride container with external electric resistance heating means.

With more particular reference to FIG. 2, an alternative preferred embodiment is shown wherein the electrical resistance heating element 157 is external to the hydride container 101. The hydride container 101 contains hydride 122 and screen 131. The hydrogen chamber 123 is provided above the screen 131. During transport and storage prior to insertion into the automobile the hydride container 101 is preferably provided with a hydride container cap 60. The hydride container 101 is shown with hydride container closure 112 and supportive threads 167. The supportive threads 167 do not provide electrical contact. The supportive threads 167 engage the receptacle threads 166 to support the container 101 within the receptacle chamber 156. The receptacle chamber 156 is defined by the receptacle wall inner surface 162. The automobile has automobile body outer surface 153 the automobile body 168 supports the receptacle wall 111. The battery 108 provides electric current through line 158 when the switch 161 is closed. Thus current flows from the battery 108 through the electrical resistance heating element 157 to heat the hydride 122 for the formation of hydrogen therefrom. The current returns through line 159 to the battery 108. The hydride container cap 160 is removed prior to insertion into the receptacle. The receptacle 111 is provided with a plug and a distribution passage as shown in FIG. 1.

Figure 3:
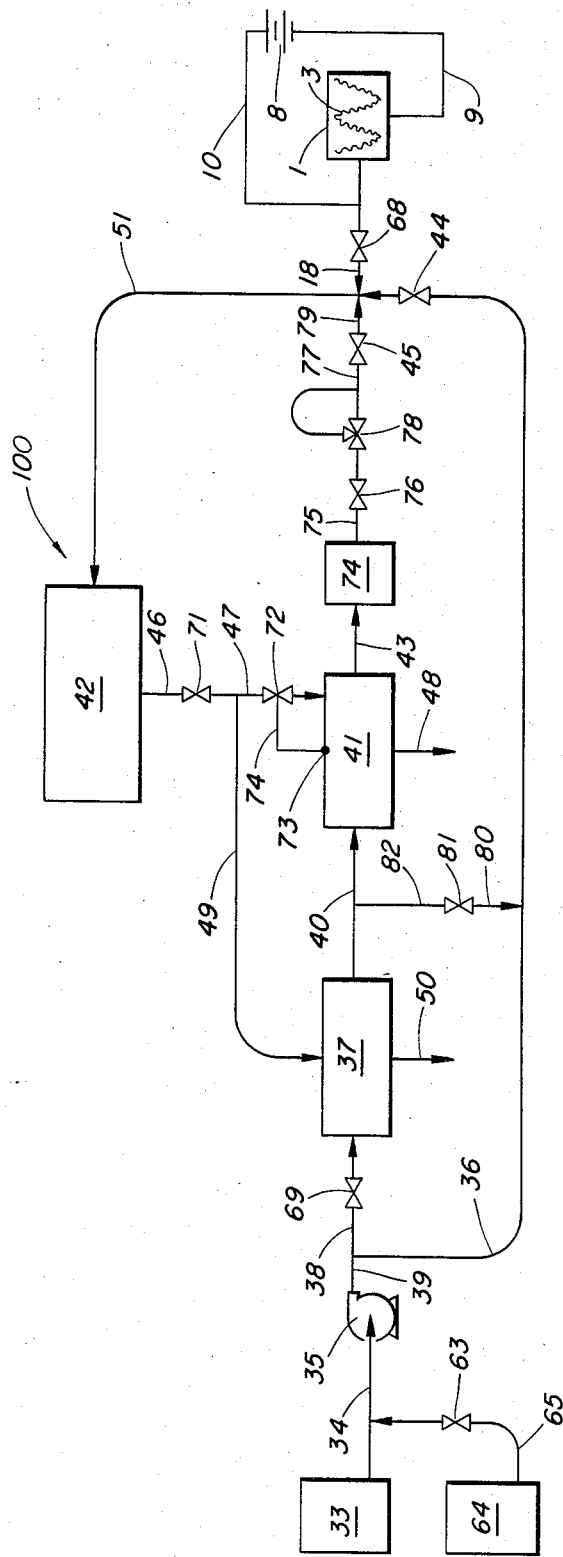
FIG. 3 shows a schematic representation of an overall system in accordance with the invention, using a dissociated fuel.

With more particular reference to FIG. 3, a schematic representation of a system in accordance with the present invention is shown. Liquid hydrocarbon storage tank 64 is connected to line 34 by line 65 having valve 63 therein. Alcohol storage tank 33 is connected by line 34 to pump 35. Thus, the system may be operated on liquid hydrocarbon or alcohol. The system may be operated on mixtures of alcohol and liquid hydrocarbon. It is within the scope of the invention to vaporize all or at least a portion of the liquid fuel be it alcohol, hydrocarbon or mixture thereof and operating the internal combustion thereon after mixing with oxygen from air. The vaporized alcohol may be used directly as fuel for the internal combustion engine or it may be dissociated thermally or catalytically into a hydrogen rich gaseous mixture which then may be passed to the engine after mixing with oxygen from air.

In a preferred embodiment of the invention, the internal combustion engine is operated on liquid methanol. The system is started by use of hydrogen formed from hydride in the hydride container 1 as hereinabove described. Thus, the internal combustion engine is started on hydrogen formed from hydride and the operation therof is sustained and continued by fueling the internal combustion engine with liquid methanol.

In another preferred embodiment of the invention, the internal combustion engine is started with hydrogen formed from hydride and the operation of the internal combustion is then continued by combustion of hydrogen formed by dissociation of methanol vapor. Within the context of the latter preferred embodiment, fuel for acceleration is preferably provided by injection of atomized liquid methanol into the internal combustion engine.

As shown in the FIG. 3, a fuel system is generally shown at 100. The fuel system 100 has a catalyst containing reactor 41 and a by-pass conduit 36. Liquid alcohol is stored in the liquid alcohol storage tank 33. From liquid alcohol storage tank 33 the liquid alcohol is conveyed in liquid alcohol conduit 34 by pump 35 to vaporizer feedline 88 and by-pass conduit 36. Liquid alcohol passes from vaporizer feedline 38 through solenoid valve 69 and into the vaporizer 37. The vaporizer 37 is heated by engine coolant (not shown or exhaust which enters vaporizer 37 through vaporizer heat transfer feedline 49. From the vaporizer the engine coolant returns to the engine through vaporizer heat transfer fluid output line (not shown). Exhaust passes to the atmosphere through line 50. The vaporized alcohol is conveyed from the vaporizer 37 by line 40 to the catalyst containing reactor 41. The catalyst containing reactor 41 operates at about 600° F. The vaporized alcohol is dissociated into hydrogen and carbon monoxide in the catalyst containing reactor 41. A preferred catalyst for dissociation in the catalyst bed of the catalyst containing reactor 41 is a copper/zinc catalyst with or without promoters such as chromium. However, the dissociater may be provided with a dual catalyst bed; one catalyst being a low temperature dissociation catalyst and the other catalyst being a high temperature dissociation catalyst. Useful as a low temperature (200°–300° C.) catalyst is a copper/zinc catalyst with or without promoters. Useful as a high temperature (300°–400° C.) catalyst is a zinc/chromium catalyst. The advantage of having a dual catalyst bed is that the low temperature catalyst is protected from deactivation by thermal sintering because the dissociation reaction in the high temperature catalyst zone reduces the operating temperature of the low temperature catalyst bed. Thus, the vaporized alcohol first contacts the high temperature catalyst and then contacts the low temperature catalyst as it passes through the catalyst containing reactor 41.

The dissociation catalyst bed may be low temperature catalyst alone for example a copper/zinc catalyst as previously mentioned.

The catalyst containing reactor 41 and the superheater shown in the drawing are heated by exhaust from the internal combustion engine 42. Exhaust from the internal combustion engine 42 is conveyed by conduit 46 having solenoid valve 71 and then through line 47 and 72 to the catalyst containing reactor 41. The engine exhaust leaves the catalyst containing reactor 41 through the conduit 48. This cooled engine exhaust may be recycled to the engine or exhausted to the atmosphere or partially recycled and partly exhausted to the atmosphere.

An exhaust flow valve 72 is connected by line 74 to temperature control sensor 73, to control the temperature of the catalyst containing reactor 41. Engine exhaust from the engine 42 may be by-passed around the catalyst containing reactor 41. By controlling the amount of exhaust used to heat the catalyst containing reactor 41 the temperature of the catalyst containing reactor may be regulated. The exhaust flow valve 72 is connected to a temperature sensor 73 on the reactor 41.

Hydrogen containing gas from the catalyst containing reactor 41 passes through conduit 43 and the surge tank 74. From the surge tank 74 gas travels through line 75 and valve 76 to the pressure control valve 78. From the pressure control valve 78 the hydrogen rich dissociated alcohol mixture travels through line 77 to the dissociated gas control mechanism 45. From the dissociated gas control mechanism 45, the gas travels through line 79 to fuel feed conduit 51 into engine 42. The dissociated gas control mechanism 45 and the fuel flow mechanism 44 may for example be that of an automobile fuel injection system or an automobile carburetor.

Alcohol from by-pass conduit 36 also passes into fuel feed conduit 51. By-pass conduit 36 is provided with fuel flow mechanism 44. Fuel flow mechanism 44 controls the amount of alcohol to be fed into the internal combustion engine 42 via fuel feed conduit 51.

FIG. 4 shows a partial cross sectional view of the hydride container and the receptacle wall 11. Line 9 is electrically connected to conductor 200. Conductor 200 extends through automobile body 68 and is electrically insulated therefrom by electrical insulation 207. Electrical conductor 200 is electrically connected 200 is electrically connected to electrical conductor 201. Electrical conductor 201 is supported by automobile body 68 and electrically insulated therefrom by electrical insulator 208.

In operable position with receptacle wall 11 inserted into the automobile body 68 the electrical conductor 201 is in electrical conducting contact with electrical conductor 202. Electrical conductor 202 is supported by receptacle wall 11 and electrically insulated therefrom by electrical insulator 209. Electrical conductor 202 is electrically connected to electrical conductor 203. Electrical conductor 203 extends through receptacle wall 11 and is electrically insulated therefrom by electrical insulator 210. Electrical conductor 203 is electrically connected to electrical conductor 204. Electrical conductor 204 is supported by receptacle wall 11 and electrically insulated therefrom by electrical insulator 211.

When operably assembled, the hydride container wall 30 supports electrical conductor 205 in electrical contact with electrical conductor 204. Electrical conductor 205 is electrically insulated from wall 30 by electrical insulator 212. Electrical conductor 205 is electrically connected to electrical conductor 206 extends through hydride container wall 30 and is electrically insulated therefrom by electrical insulator 213. Electrical conductor 206 is in electrical conducting contact with contact connector 26. Contact connector 26 is connected to electrical resistance heating element 3.

As shown in FIG. 5, line 10 is electrically connected to electrical conductor 214 at electrical connection point 219. Electrical connection point 219 may for example be a soldering type weld. Electrical conductor 214 extends through receptacle wall 11. Electrical conductor 214 is electrically insulated from receptacle wall 11 by electrical insulation 217. Electrical conductor 214 is in electrically conducting contact with electrically conducting spring 215. Electrically connecting spring 215 is in electrical contact with hemispherical cap 216. The electrically conducting hemispherical cap 216 is in electrically conducting contact with electrical contact 4. Electrical contact 4 is electrically connected to electrical connector 27. Electrical connector 27 is electrically connected to electrical resistance heating element 3. Electrical contact 4 is electrically insulated by electrical insulator 218 from container wall 52.

The plug 14 is made of an electrical insulating material. Thus, current flows through line 10, conductor 214, spring 215, cap 216, contact 4, connector 27 and electrical resistance heating element 3.

The preferred alcohol for use in the fuel system is methanol. Among the advantages of the by-pass conduit system is that more fuel material may be passed into the internal combustion engine 42 during periods of peak operation, such as in the case where quantities of fuel in excess of those of normal operation are needed for example during startup and acceleration.

The line 82 connects evaporator 37 to valve 81. Line 80 connects valve 81 to line 36. Valve 81 controls the proportion of liquid and vapor feed through line 36. Thus, evaporated methanol may be fed to line 36 to provide a mixed feed of vaporized methanol and liquid methanol to engine 42 via line 51.

Because of the capacity of the acceleration loop, the dissociation reactor need only be large enough to handle normal operation conditions. Periods of peak operation can be handled by the capacity of the acceleration loop.

With more particular reference to FIG. 3, the start-up is carried out as follows.

The valves 44, 45 and 69 are closed while the hydrogen is being formed in the hydride container 1. During start-up, the switch 32 is closed and electrical current passes from the battery 8 through line 10 to the electrical resistance heating element 3. The temperature in the hydride container 1 is raised causing the release of hydrogen from the hydride. The hydrogen passing from the hydride container 1 passes through valve 68 and line 18 into line 51. Thus the hydrogen from the hydride container 1 passes through lines 18 and 51 into the engine 42. The engine 42 is started using this hydrogen formed from the hydride.

In another embodiment of the invention as shown in FIG. 6, a fuel system is generally shown at 400. The container 301 in association with a battery 308 may be used with a conventional fuel distribution system. In such systems during operation, gasoline or diesel fuel is pumped from a tank 333 through a line 334 through a pump 335. From pump 335, the gasoline or diesel fuel travels through a line 336 through a fuel flow mechanism 344 which may be an automobile fuel injection system or an automobile carburetor. From the mechansim 344, the fuel travels through line 351 to the engine 342. During startup, a hydrogen rich gaseous mixture from the hydride container 301 passes through valve 368 in line 318 to a line 351 wherein it mixes with the fuel in line 351 for engine startup. Air may be mixed with the conventional fuel in mechanism 344.

Alternatively the embodiment shown in FIG. 6 may be operated during startup by heating hydride container to provide hydrogen rich gas through line 318 and line 351 to the engine 342. Air may be drawn in through mechanism 344 for the startup. Thus, the engine may be started with hydrogen rich fuel from the hydride container 301, or by a mixture of fuel from container 333 and hydrogen rich gas from container 301 mixed with air.

While the invention has been described above with respect to certain of its preferred embodiments, it is respectfully pointed out that many variations and modifications are possible within the scope of the present invention and it is anticipated that many such variations and modifications may appear obvious or desirable to those skilled in the art based upon a review of the foregoing description of preferred embodiments.

What is claimed is:

1. A method for starting and operating an internal combustion engine comprising the steps as follows:
   (a) providing a fuel distribution means in fluid communication with said engine,
   (b) providing a hydride containing means in fluid communication with said distribution means, and an electrical resistance heating means adapted to heat said containing means,
   (c) providing electrical current source means,
   (d) passing electrical current to said electrical resistance heating means from said electrical current source means whereby hydrogen is liberated in said containing means,
   (e) passing the thus-liberated hydrogen through said fuel distribution means to said internal combustion engine,
   (f) starting said internal combustion engine using said hydrogen as fuel, and
   (g) operating said engine on an alternate fuel other than said hydrogen subsequent to said step of starting.

2. The method of claim 1 further comprising mixing hydrogen with atomized liquid alcohol said fuel distribution means to form a gas-liquid fuel mixture and passing said gas-liquid fuel mixture to said internal combustion engine.

3. The method of claim 2 further comprising mixing air with said fuel mixture to form a combustion mixture and passing said combustion mixture to said internal combustion engine.

4. A method of producing fuel and starting an automobile internal combustion engine which is continuously operated after start-up on an alternate fuel comprising a carbon-containing compound comprising the steps of:
   (a) providing a readily replaceable first container having an initial amount of hydride therein the fluid flow communication with said internal combustion engine,
   (b) heating said hydride whereby hydrogen is produced leaving a hydrogen depleted product and a remainder of hydride, said remainder of hydride being lesser in amount than said initial amount of hydride,
   (c) initially starting said engine using said produced hydrogen as fuel, and
   (d) thereafter supplying said alternate fuel to said engine to sustain is continuing operation after start-up,
   whereby said remainder of hydride without regeneration of hydrogen-depleted product is available for the next starting of said engine.

5. The method of claim 4 wherein said heating is provided by an electrical resistance heating element within said container.

6. The method of claim 4 wherein said heating is provided by an electrical resistance heating element external and adjacent to said container.

7. The method of claim 4 wherein said initial amount of hydride is provided in an amount sufficient for at least ten start-ups of said engine.

8. The method of claim 4 further comprising replacing said first container with a second container having hydride therein.

9. The method of claim 4 further comprising the additional sequence of steps of:
   (d) heating said remainder of hydride in said container
   (e) starting said engine.

10. The method of claim 4 wherein said alternate fuel is atomized liquid or vapor.

* * * * *